United States Patent
Lee

(10) Patent No.: US 8,959,336 B1
(45) Date of Patent: *Feb. 17, 2015

(54) SECURING LOCALLY STORED WEB-BASED DATABASE DATA

(71) Applicant: Bryant Lee, Bethesda, MD (US)

(72) Inventor: Bryant Lee, Bethesda, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 14/324,215

(22) Filed: Jul. 6, 2014

Related U.S. Application Data

(63) Continuation of application No. 12/890,008, filed on Sep. 24, 2010.

(51) Int. Cl.
  *H04L 29/06* (2006.01)

(52) U.S. Cl.
  CPC .................... *H04L 63/0823* (2013.01)
  USPC .......................................................... 713/156

(58) Field of Classification Search
  CPC ... H04L 63/0823; H04L 63/10; H04L 63/126; H04L 67/02; G06F 21/6218
  USPC .......................................................... 713/156
  See application file for complete search history.

(56) References Cited

U.S. PATENT DOCUMENTS

| | | | |
|---|---|---|---|
| 5,974,416 A | | 10/1999 | Anand et al. |
| 6,189,097 B1 | | 2/2001 | Tycksen, Jr. et al. |
| 6,339,423 B1 * | | 1/2002 | Sampson et al. ............. 715/854 |
| 6,473,740 B2 * | | 10/2002 | Cockrill et al. ............ 705/26.81 |
| 6,845,383 B1 * | | 1/2005 | Kraenzel et al. ...................... 1/1 |
| 6,985,953 B1 * | | 1/2006 | Sandhu et al. ................ 709/229 |
| 7,054,900 B1 | | 5/2006 | Goldston |
| 7,127,607 B1 * | | 10/2006 | Su et al. ......................... 713/156 |
| 7,137,006 B1 * | | 11/2006 | Grandcolas et al. .......... 713/180 |
| 7,191,467 B1 * | | 3/2007 | Dujari et al. ...................... 726/5 |
| 7,231,661 B1 * | | 6/2007 | Villavicencio et al. ........... 726/4 |
| 7,249,369 B2 * | | 7/2007 | Knouse et al. .................... 726/1 |
| 7,398,311 B2 * | | 7/2008 | Joshi et al. ..................... 709/225 |
| 7,464,162 B2 * | | 12/2008 | Chan ............................. 709/225 |
| 7,542,468 B1 * | | 6/2009 | Begley et al. ................. 370/389 |
| 7,594,003 B2 * | | 9/2009 | Davidson et al. ............. 709/219 |
| 7,630,986 B1 | | 12/2009 | Herz et al. |
| 7,673,135 B2 * | | 3/2010 | Chin et al. ..................... 713/159 |
| 7,698,735 B2 * | | 4/2010 | Dujari et al. ...................... 726/8 |
| 7,778,987 B2 * | | 8/2010 | Hawkins ........................ 707/705 |
| 7,797,278 B2 * | | 9/2010 | Katoh et al. ................... 707/640 |
| 7,814,234 B2 * | | 10/2010 | Hawkins et al. .............. 709/250 |
| 8,190,703 B2 * | | 5/2012 | Lin et al. ....................... 709/217 |
| 8,219,533 B2 * | | 7/2012 | Bennett ......................... 707/692 |
| 8,384,940 B2 * | | 2/2013 | Sako et al. .................... 358/1.15 |
| 8,533,350 B2 * | | 9/2013 | Jakobsson et al. ............ 709/229 |
| 8,583,612 B2 * | | 11/2013 | Bennett ......................... 707/694 |
| 8,601,475 B2 * | | 12/2013 | Landsman .................... 718/100 |
| 8,650,634 B2 * | | 2/2014 | Bajekal .......................... 726/17 |

(Continued)

*Primary Examiner* — David Garcia Cervetti

(57) ABSTRACT

The present invention extends to methods, systems, and computer program products for locally storing Web-based database data in a secure manner. Embodiments of the present invention permit Web-based database data to be locally stored at a computer system to increase the efficiency of rendering the Web-based database data within a Web browser at the computer system. Web-based database data can be sandboxed per domain to mitigate (and possibly eliminate) the exposure of the Web-based database data to malicious computer systems. A web server may be required to authenticate itself before it may present database data to be locally stored at a computer system. A web server may be required to authenticate itself before being allowed to access database data stored locally at a computer system.

18 Claims, 8 Drawing Sheets

(56) References Cited

U.S. PATENT DOCUMENTS

| | | | |
|---|---|---|---|
| 8,656,468 B2 * | 2/2014 | Ponnath | 726/7 |
| 8,719,572 B2 * | 5/2014 | Schertzinger | 713/170 |
| 2001/0045451 A1 * | 11/2001 | Tan et al. | 235/375 |
| 2002/0027992 A1 * | 3/2002 | Matsuyama et al. | 380/231 |
| 2002/0032857 A1 * | 3/2002 | Kon et al. | 713/156 |
| 2002/0069361 A1 * | 6/2002 | Watanabe et al. | 713/185 |
| 2003/0188156 A1 * | 10/2003 | Yasala et al. | 713/156 |
| 2004/0143787 A1 | 7/2004 | Grancharov et al. | |
| 2005/0102503 A1 * | 5/2005 | Imai | 713/156 |
| 2005/0216468 A1 | 9/2005 | Fujiwara et al. | |
| 2005/0216582 A1 * | 9/2005 | Toomey et al. | 709/224 |
| 2006/0101114 A1 * | 5/2006 | Sandhu et al. | 709/203 |
| 2006/0170778 A1 * | 8/2006 | Ely et al. | 348/207.99 |
| 2006/0277596 A1 * | 12/2006 | Calvert et al. | 726/3 |
| 2007/0033155 A1 * | 2/2007 | Landsman | 707/1 |
| 2007/0044144 A1 * | 2/2007 | Knouse et al. | 726/8 |
| 2007/0106748 A1 * | 5/2007 | Jakobsson et al. | 709/217 |
| 2007/0143217 A1 * | 6/2007 | Starr | 705/51 |
| 2007/0143256 A1 * | 6/2007 | Starr | 707/3 |
| 2007/0234432 A1 * | 10/2007 | Korkishko et al. | 726/27 |
| 2008/0022013 A1 * | 1/2008 | Adelman et al. | 709/245 |
| 2008/0028443 A1 * | 1/2008 | Adelman et al. | 726/4 |
| 2008/0034211 A1 * | 2/2008 | Shull et al. | 713/175 |
| 2008/0052775 A1 * | 2/2008 | Sandhu et al. | 726/14 |
| 2008/0082818 A1 * | 4/2008 | Kim et al. | 713/156 |
| 2008/0086477 A1 * | 4/2008 | Hawkins | 707/10 |
| 2008/0115228 A1 | 5/2008 | Martinez et al. | |
| 2008/0256605 A1 * | 10/2008 | Malinen | 726/4 |
| 2009/0089290 A1 * | 4/2009 | Nachenberg et al. | 707/9 |
| 2009/0100438 A1 * | 4/2009 | Hinton et al. | 719/311 |
| 2009/0119402 A1 * | 5/2009 | Shull et al. | 709/224 |
| 2009/0240936 A1 * | 9/2009 | Lambiase et al. | 713/156 |
| 2009/0271707 A1 * | 10/2009 | Lin et al. | 715/738 |
| 2010/0017596 A1 * | 1/2010 | Schertzinger | 713/155 |
| 2010/0125895 A1 * | 5/2010 | Shull et al. | 726/4 |
| 2010/0161969 A1 * | 6/2010 | Grebovich et al. | 713/156 |
| 2010/0180337 A1 * | 7/2010 | Bajekal | 726/19 |
| 2010/0192220 A1 | 7/2010 | Heizmann et al. | |
| 2010/0211773 A1 * | 8/2010 | Lawrence et al. | 713/156 |
| 2011/0099617 A1 * | 4/2011 | Ponnath | 726/7 |
| 2011/0179469 A1 * | 7/2011 | Blinn et al. | 726/4 |
| 2011/0214163 A1 * | 9/2011 | Smith et al. | 726/4 |
| 2012/0259830 A1 * | 10/2012 | Bennett | 707/706 |
| 2014/0047522 A1 * | 2/2014 | Chin et al. | 726/6 |
| 2014/0082058 A1 * | 3/2014 | Landsman | 709/203 |
| 2014/0130147 A1 * | 5/2014 | Bajekal | 726/17 |

\* cited by examiner

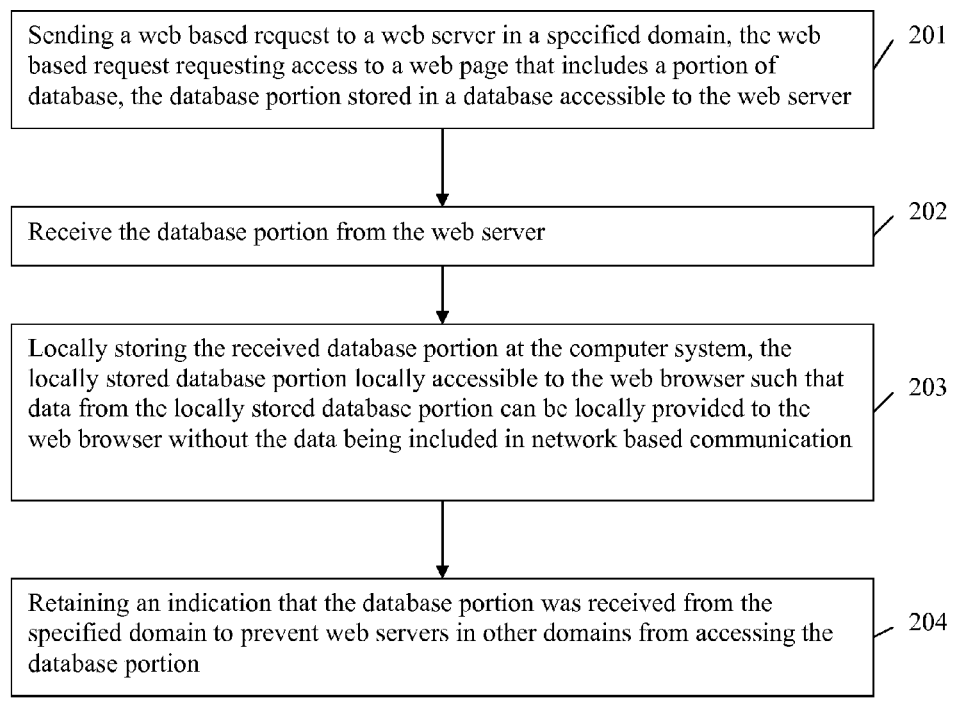
FIG. 2A                      200

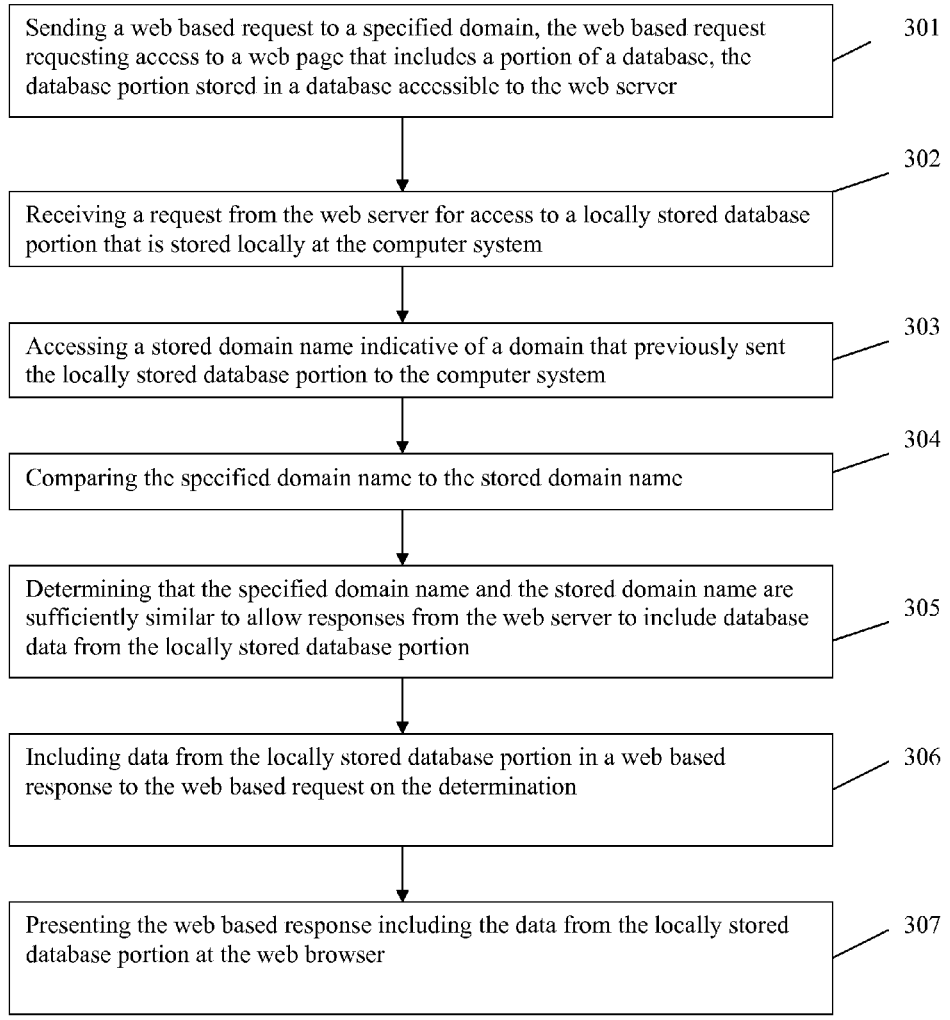
FIG. 3A        300

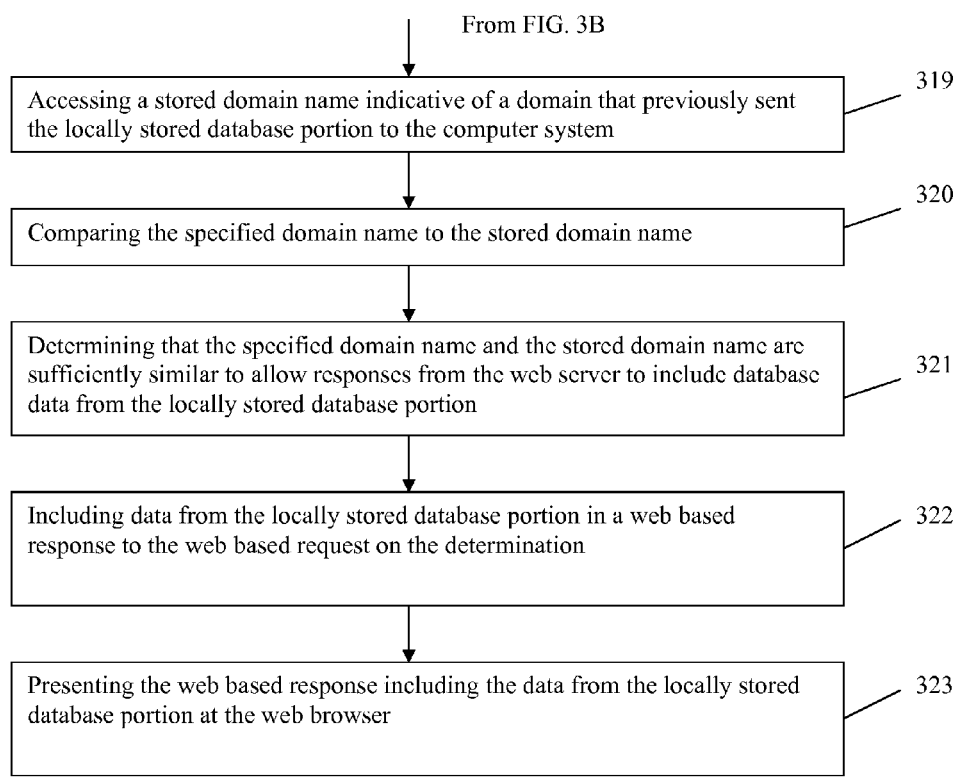
FIG. 3C    310

SECURING LOCALLY STORED WEB-BASED DATABASE DATA

CROSS-REFERENCE TO RELATED APPLICATIONS

This application is a continuation of U.S. application Ser. No. 12/890,008 filed Sep. 24, 2010 ("Securing Locally Stored Web-based Database Data" by inventor Bryant Lee), which is hereby incorporated by reference in its entirety.

BACKGROUND

Users surf the World Wide Web by using web browsers on their personal computers to access web pages and other data that are stored on remote web servers, where the personal computers are connected to the remote web servers via the Internet. The Internet is a global system of interconnected computer networks. The World Wide Web comprises a set of inter-linked hypertext documents called web pages.

One common form of network based communication is exchanging electronic messages on the Worldwide Web ("WWW"). Content on the Worldwide Web is typically accessed in a client/server model. A "Web browser" of a client computer system sends a request to access content that is provided by a "Web Server" of a server computer system (e.g., by entering a Uniform Resource Locator ("URL") into the Web browser). If the user of the Web browser is authorized to access the content, the Web server typically provides the content to the Web browser. In a Web environment, content and requests for content, are frequently transported using Hypertext Transfer Protocol ("HTTP"). Web-based content can be provided in HyperText Markup Language ("HTML") pages, style sheets, images, scripts, etc.

Most, if not all Web browsers, cache portions of Web-based content in a common storage location (the browser cache) so that subsequent renderings of a Web page can be presented more efficiently. For example, when a Web browser receives a Web page from a Web server, the Web browser can locally cache portions of the content included in the Web page. Thus, if the Web browser is subsequently directed to the same Web page, the Web browser can check the common storage location for cached portions of content and any cached portions of content can be combined with other content received via the network to construct the Web page. Accordingly, using locally cached content potentially reduces the amount of data that is transferred over a network in order to display content from the Web server. As a result, Web pages can be rendered more quickly improving the user experience.

However, typically, even if only a portion of a Web page changes the entire page is reloaded over the network for display on a Web browser. For example it may be that a Web browser accesses a Web page, downloads content of the Web page via network communication, and caches content from the Web page. If the content of the Web page subsequently changes, the Web browser can be required to re-download the entire Web page even if only small portions of the Web page have changed.

Thus more recently, some Web browsers have implemented partial page updates to better utilize cached content. Content is re-downloaded when an applicable portion of a Web page changes. However, a Web browser is not necessarily required to re-download all the content of Web page in response to a change to a portion of the Web page. For example, when a single image in a Web page changes, the Web browser can detect the change and re-download the single image without having to re-download other cached content that has not changed.

Some Web-based applications also permit Web browsers to interact with data from a database (e.g., an SQL database). A Web server receives a request from a Web browser, accesses an appropriate portion of database data, and returns the database data to the Web browser. Depending on the configuration of the Web based application, a user may also be able to change portions of database data through the Web browser. For example, a user may be able to create and modify database records through the Web browser. In some environments, a user is able to implement SQL operations (CREATE TABLE, SELECT, INSET, UPDATE, DELETE, etc.) through a Web browser. Thus, a Web browser essentially provides a user-interface for manipulating database data over a network (e.g., the Internet).

U.S. Pat. No. 7,778,987 ("Hawkins") discloses a method for caching database data in a web browser. Hawkins discloses that the computer system receives a portion of the database from the Web server. The computer system locally stores the received database portion at the computer system. The locally stored database portion is locally accessible to the Web browser such that data from the locally stored database portion can be locally provided to the Web browser without the data being included in network based communication. The computer system retains an indication that the database portion was received from the specified domain to prevent script code from Web servers in other domains from accessing the database portion.

Hawkins discloses that a computer system renders tabular database data within the Web browser. The computer system sends a Web based request to a Web server in a specified domain indicated by a specified domain name. The Web based request is for accessing a Web page that includes a portion of a database stored in a database accessible to the Web server.

Hawkins discloses that the computer system receives a request from the Web server for access to a locally stored database portion that is stored locally at the computer system. The computer system accesses a stored domain name indicative of a domain that previously sent the locally stored database portion to the computer system. The computer system compares the specified domain name to the stored domain name. The computer system determines that the specified domain name and the stored domain name are sufficiently similar to allow responses from the Web server to include database data from the locally stored database portion. The computer system includes data from the locally stored database portion in a Web based response to the Web based request based on the determination. The computer system presents the Web based response including the data from the locally stored database portion at the Web browser.

However, current methods do not allow for maintaining the security of cached database data in a browser. As a first example, a computer system may receive a first database portion from a first web server at a first domain and store that database portion in a locally accessible storage. The computer system retains an indication that the first database portion was received from the first domain. It is desirable that the computer system only allow access to the first database portion by other web servers in the first domain and not web servers in other domains. However, a second web server in a second domain may be malicious. The computer system may receive a request from the second web server for access to the locally stored first database portion. The second web server may send a false indication to the computer system that it is in the first domain rather than in the second domain. The false indication may be accepted by the computer system as truthful, and the second web server will be able to access the first database portion. Current methods do not provide a method for the computer system to prevent the second web server from accessing first database portion.

As a second example, a first web server at a first domain may be malicious. A computer system may receive a first database portion from the first web server at a first domain, but the first web server may send a false indication that it is in the second domain rather than the first domain. The false indication may be accepted by the computer system as truthful. The computer system retains, incorrectly, an indication that the first database portion was received from the second domain. The computer system seeks to only allow access to the first database portion by other web servers in the second domain due to its incorrect information. When a second web server in a second domain accesses the database portion, this may lead to errors or corruptions on web pages served from the second web server. Current methods do not provide a method for the computer system to prevent the first web server from sending a successful request to store a first database portion with a false indication that the first database portion is from a second domain.

BRIEF SUMMARY

The present invention extends to methods, systems, and computer program products for locally storing Web-based database data in a secure manner. In some embodiments, a computer system caches tabular database for subsequent Web browser access. In some embodiments, the computer system requires the web server to authenticate itself by a method of digital certification. The computer system may send a request to the web server to verify its identity. The computer system may receive from the web server a digital certificate. The digital certificate contains a digital signature of a certificate authority. The digital certificate contains a public key for the specified domain. The computer system verifies the authenticity of the digital certificate by verifying the authenticity of the digital signature of the certificate authority. The computer system sends a request to the web server requesting an acknowledgement with a digital signature of the specified domain. The computer system may receive an acknowledgement from the web server that contains a digital signature of the specified domain. The computer system may verify the authenticity of the acknowledgement by verifying the authenticity of the digital signature of the specified domain by using the public key of the specified domain. The computer system may then record that the web server has correctly authenticated itself.

The computer system sends a Web based request to a Web server in a specified domain. The Web based request requests access to a Web page that includes a portion of a database that is stored in a database accessible to the Web server.

The computer system receives a portion of the database from the Web server. The computer system locally stores the received database portion at the computer system. The locally stored database portion is locally accessible to the Web browser such that data from the locally stored database portion can be locally provided to the Web browser without the data being included in network based communication. The computer system retains an indication that the database portion was received from the specified domain to prevent script code from Web servers in other domains from accessing the database portion.

In other embodiments, a computer system renders tabular database data within the Web browser. The computer system sends a Web based request to a Web server in a specified domain indicated by a specified domain name. The Web based request is for accessing a Web page that includes a portion of a database stored in a database accessible to the Web server.

The computer system receives a request from the Web server for access to a locally stored database portion that is stored locally at the computer system. The computer system accesses a stored domain name indicative of a domain that previously sent the locally stored database portion to the computer system. The computer system compares the specified domain name to the stored domain name. The computer system determines that the specified domain name and the stored domain name are sufficiently similar to allow responses from the Web server to include database data from the locally stored database portion. The computer system includes data from the locally stored database portion in a Web based response to the Web based request based on the determination. The computer system presents the Web based response including the data from the locally stored database portion at the Web browser. In some embodiments, the computer system requires the web server to authenticate itself by a method of digital certification before it may access a locally stored database portion that is locally stored at the computer system. The computer system may send a request to the web server to verify its identity. The computer system may receive from the web server a digital certificate. The digital certificate contains a digital signature of a certificate authority. The digital certificate contains a public key for the specified domain. The computer system verifies the authenticity of the digital certificate by verifying the authenticity of the digital signature of the certificate authority. The computer system sends a request to the web server requesting an acknowledgement with a digital signature of the specified domain. The computer system may receive an acknowledgement from the web server that contains a digital signature of the specified domain. The computer system may verify the authenticity of the acknowledgement by verifying the authenticity of the digital signature of the specified domain by using the public key of the specified domain. The computer system may then record that the web server has correctly authenticated itself. The computer system may then allow responses from the web server to include database data from the locally stored database portion.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The steps of the method of the invention may be performed in different orders without changing the invention. The characteristics, purposes, and principles of the invention can be preserved despite changing the order of steps of the invention.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2A illustrates a flow chart of an example method for caching tabular database data at a computer system for subsequent Web browser access.

FIG. 3A illustrates a flow chart of an example method for rendering tabular database data within the Web browser.

FIGS. 3B-3C illustrate a flow chart of an example method for rendering tabular database data within the Web browser in a secure manner.

DETAILED DESCRIPTION

Figure 1A:
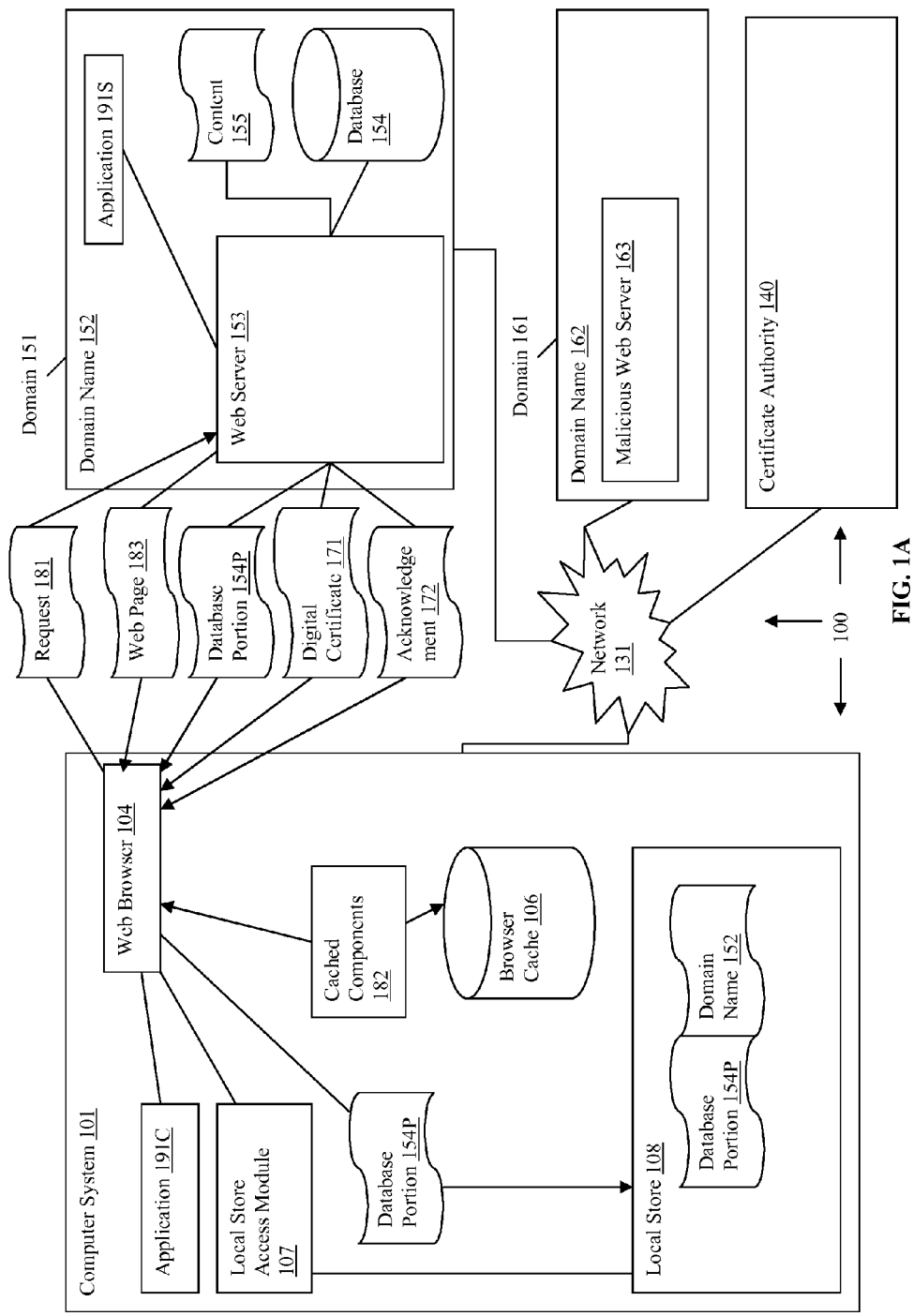
FIGS. 1A-1B illustrate an example computer architecture that facilitates locally storing Web-based database data in a secure manner.

The present invention extends to methods, systems, and computer program products for locally storing Web-based database data in a secure manner. In some embodiments, a computer system caches tabular database for subsequent Web browser access.

In some embodiments, the computer system requires the web server to authenticate itself by a method of digital certification. The computer system may send a request to the web server to verify its identity. The computer system may receive from the web server a digital certificate. The digital certificate contains a digital signature of a certificate authority. The digital certificate contains a public key for the specified domain. The computer system verifies the authenticity of the digital certificate by verifying the authenticity of the digital signature of the certificate authority. The computer system sends a request to the web server requesting an acknowledgement with a digital signature of the specified domain. The computer system may receive an acknowledgement from the web server that contains a digital signature of the specified domain. The computer system may verify the authenticity of the acknowledgement by verifying the authenticity of the digital signature of the specified domain by using the public key of the specified domain. The computer system may then record that the web server has correctly authenticated itself.

The computer system sends a Web based request to a Web server in a specified domain. The Web based request requests access to a Web page that includes a portion of a database that is stored in a database accessible to the Web server.

The computer system receives a portion of the database from the Web server. The computer system locally stores the received database portion at the computer system. The locally stored database portion is locally accessible to the Web browser such that data from the locally stored database portion can be locally provided to the Web browser without the data being included in network based communication. The computer system retains an indication that the database portion was received from the specified domain to prevent script code from Web servers in other domains from accessing the database portion.

In other embodiments, a computer system renders tabular database data within the Web browser. The computer system sends a Web based request to a Web server in a specified domain indicated by a specified domain name. The Web based request is for accessing a Web page that includes a portion of a database stored in a database accessible to the Web server.

The computer system receives a request from script code from the Web server for access to a locally stored database portion that is stored locally at the computer system. The computer system accesses a stored domain name indicative of a domain that previously sent the locally stored database portion to the computer system. The computer system compares the specified domain name to the stored domain name. The computer system determines that the specified domain name and the stored domain name are sufficiently similar to allow responses from the Web server to include database data from the locally stored database portion. The computer system includes data from the locally stored database portion in a Web based response to the Web based request based on the determination. The computer system presents the Web based response including the data from the locally stored database portion at the Web browser. In some embodiments, the computer system requires the web server to authenticate itself by a method of digital certification before it may access a locally stored database portion that is locally stored at the computer system. The computer system may send a request to the web server to verify its identity. The computer system may receive from the web server a digital certificate. The digital certificate contains a digital signature of a certificate authority. The digital certificate contains a public key for the specified domain. The computer system verifies the authenticity of the digital certificate by verifying the authenticity of the digital signature of the certificate authority. The computer system sends a request to the web server requesting an acknowledgement with a digital signature of the specified domain. The computer system may receive an acknowledgement from the web server that contains a digital signature of the specified domain. The computer system may verify the authenticity of the acknowledgement by verifying the authenticity of the digital signature of the specified domain by using the public key of the specified domain. The computer system may then record that the web server has correctly authenticated itself. The computer system may then allow responses from the web server to include database data from the locally stored database portion.

The steps of the method of the invention may be performed in different orders without changing the invention. The characteristics, purposes, and principles of the invention can be preserved despite changing the order of steps of the invention.

Embodiments of the present invention may comprise a special purpose or general-purpose computer including computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, computer-readable media can comprise physical (or recordable type) computer-readable storage media, such as, RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer, the computer properly views the connection as a computer-readable medium. Thus, by way of example, and not limitation, computer-readable media can also comprise a network or data links which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1A illustrates an example computer architecture 100 that facilitates locally storing Web-based database data. Computer architecture 100 includes computer system 101, network 131, domain 152, and certificate authority 140. Depicted in computer architecture 100 are various components including application 191C, Web browser 104, application 191S, and Web server 153. Each of the various components can be connected to network 131, such as, for example, a Local Area Network ("LAN"), a Wide Area Network ("WAN"), or even the Internet. Thus, the various components can receive data from and send data to other components connected to the network. Accordingly, the components can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network. For example, components can exchange Simple Object Access Protocol ("SOAP") envelopes containing Web service related data. In some embodiments, application 191C and application 191S are different portions of a distributed application, such as, for example, a Web services application. The certificate authority 140 is an entity that issues digital certificates. The digital certificates may certify the ownership of a public key in a public key cryptography system by the named subject of the certificate. A digital certificate may contain a digital signature.

Web browser 104 can be configured to request Web-based content from domains, such as, for example, domain 151, accessible via network 131. Web-based content can include text data, image data, audio/video data, etc. One or more Web-based applications, such as, for example, application 191C, can be configured to run within Web browser 104. A Web-based application can be a script and/or other computer-executable instructions. Web-based applications can request other types of data, such as, for example, database data, from domains accessible via network 131.

Domain 151 can be identified by domain name 152, such as, for example, domain name service ("DNS") name that is resolvable to an IP address. Domain name 152 can be entered to a Web browser (potentially along with other identifying information for a specified application within the domain 151) to direct a browser to request content from Web server 153. A domain name along with other identifying information can be included in a Uniform Resource Locator ("URL") entered into a Web browser. Depending on a type of request and/or a received URL, Web server 153 can access content from content 155 and/or initiate a Web-based application, such as, for example, application 191S. Application 191S can request data from other locations in domain 151, such as, for example, from database 154 (e.g., a SQL or other relational database). Web server 153 can include content from 155 and/or data from database 154 in a response to a Web browser request.

Browser cache 106 is configured to cache components included in Web-based content received from domains, including domain 151. The cached components can subsequently be made available to fulfill Web-based requests sent from Web browser 104. For example, cached components 182 can be portions of content 155 accessed directly from browser cache 106 (without the need for transporting cached components 182 via network 131) and rendered within Web browser 104.

When a Web server is attempting to respond to a request from Web browser 104, script code from the Web server can access browser cache 106 to search for locally cached components. When cached components are identified, the Web server can access the components and include the components in a response that is to be rendered within Web browser 104. Thus, browser cache 106 is generally accessible to any Web server communicating with Web browser 104. Accordingly, a Web server in one domain can access cached components in browser cache 106 that were cached for a Web server in a different domain.

On the other hand, local store access module 107 manages access to local store 108. Local store 108 is configured to store database data received in response to Web-based requests. Database data stored in local store 108 can be accessed by Web browser 104 (without the need for transporting the database data via network 131) and rendered in a Web-based application within Web browser 104. Database data can be stored in local store 108 along with an indication of the domain that sent the database data to Web browser 104.

Local store access module 107 can filter requests from script code from Web servers to access database data stored in local store 108 such that one domain is prevented from accessing another domains database data. Thus, although database data is stored in local store 108, the database data is not generally accessible to fulfill requests for any domain (in contrast to components stored in browser cache 106 which are generally accessible to Web servers from any domain).

FIG. 2A illustrates a flow chart of an example method 200 for caching tabular database data at a computer system for subsequent Web browser access. The method 200 will be described with respect to the components of computer architecture 100 depicted in FIG. 1A.

Method 200 includes an act of sending a Web based request to a Web server in a specified domain, the Web based request requesting access to a Web page that includes a portion of database data, the database portion stored in a database accessible to the Web server (e.g., through script code execution) (act 201). For example, script code of application 191C (running within browser 104) can send request 181 to Web server 153 in domain 151. Request 181 can be a request for access to a Web page that includes a portion of database 154.

Web server 153 can receive request 181 and route at least a portion of request 181 to application 191S. Application 191S can access database portion 154P from database 154 in response to receiving the request. When appropriate, Web server 153 can combine any database data accessed from database portion 154P with other content from content 155. From database portion 154P and potentially other content, Web server 153 can formulate Web page 183. Web server 153 can send Web page 183 to Web browser 104.

Web browser 104 can receive Web page 183. Web browser 104 can render some portions of content and forward any database data to application 191C. Application 191C can process and render the database data.

In response to request 181, Web server 153 can also send database portion 154P to Web browser 104.

Method 200 includes an act of receiving the database portion from the Web server (act 202). For example, Web browser 104 can receive database portion 154P included in Web page 183. Alternately, Web browser 104 can receive database portion 154P that was sent separately to Web browser 104 in response to request 181.

Method 200 includes an act of locally storing the received database portion at the computer system, the locally stored database portion being locally accessible to the Web browser such that data from the locally stored database portion can be locally provided to the Web browser without the data being included in network based communication (act 203). For example, Web browser 104 can store database portion 154P in local store 108. Accordingly, database portion 154P is locally accessible to Web browser 104 such that the locally stored database portion 154P can be provided to Web browser 104 without transferring database portion 154P via network 131.

Method 200 includes an act of retaining an indication that the database portion was received from the specified domain to prevent Web servers in other domains from accessing (e.g., through script code execution) the database portion (act 204). For example, domain name 152 can be stored along with database portion 154P in local store 108 to indicate that database portion 154P was received from domain 151. Local store access module 107 can compare the domain name associated with subsequent requests for database portion 154P to domain name 152 to determine if requests to access database portion 154P are granted.

Figure 2B:
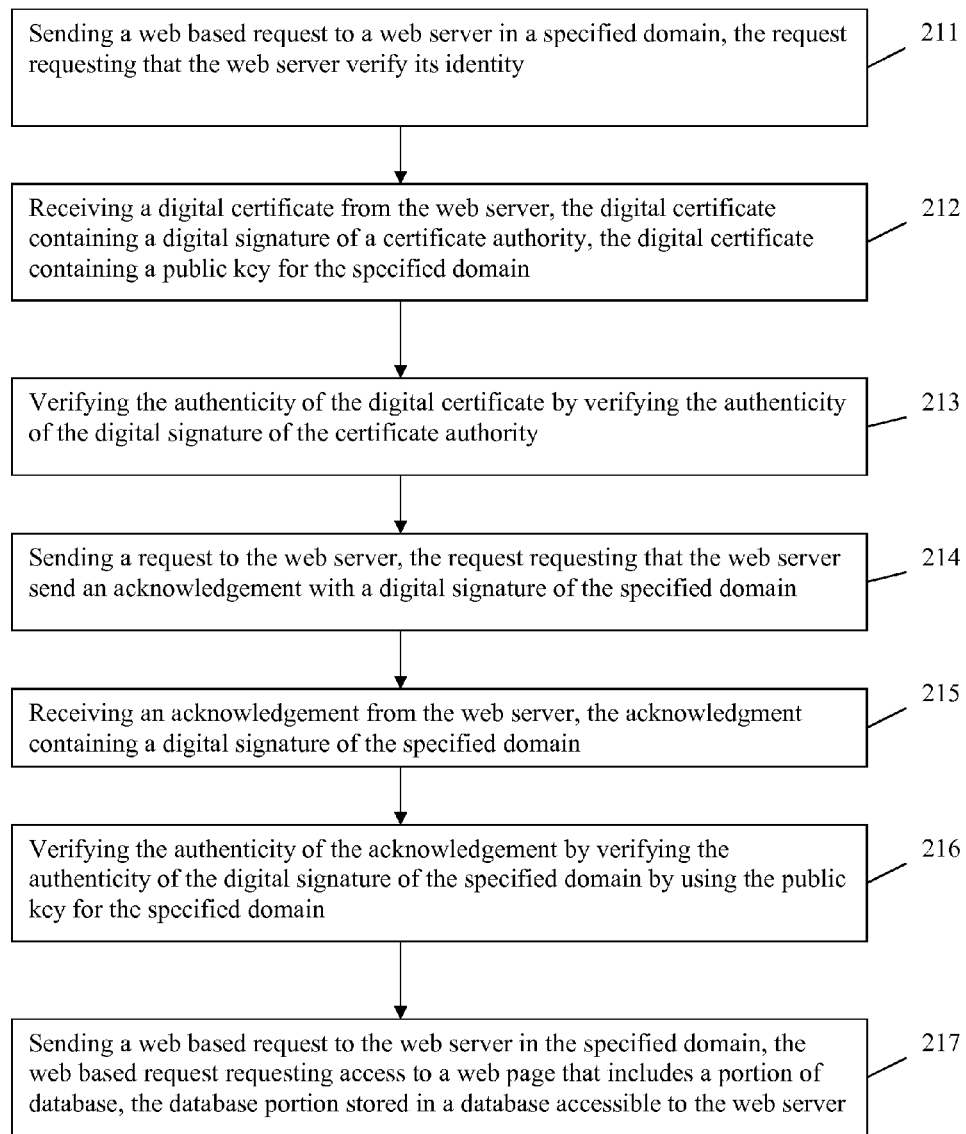
FIGS. 2B-2C illustrate a flow chart of an example method for caching tabular database data at a computer system for subsequent Web browser access in a secure manner.
Figure 2C:
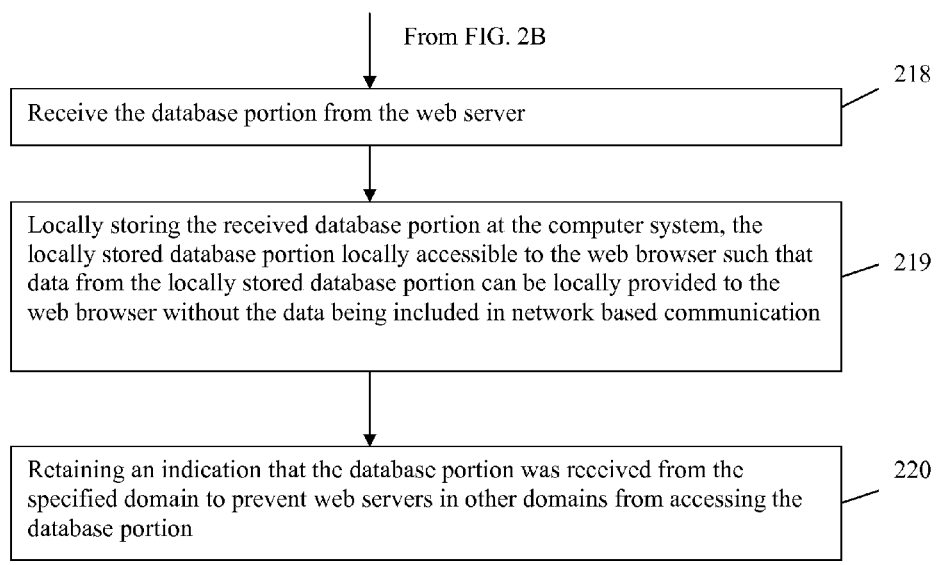

FIGS. 2B and 2C illustrate a flow chart of an example method 210 for caching tabular database data at a computer system for subsequent Web browser access in a secure manner. The method 210 will be described with respect to the components of computer architecture 100 depicted in FIG. 1A.

Method 210 includes an act of sending a web based request to the web server in the specified domain requesting that the web server verify its identity (act 211). Method 210 includes an act of receiving a digital certificate 171 from the web server 153, the digital certificate 171 containing a digital signature of the certificate authority 140, and the digital certificate 171 containing a public key for the specified domain (act 212). A public key may be a public key in a public key cryptography system. RSA is one example of a public key cryptography system. The present invention may be used with any public key cryptography system. A digital signature may be a message, file, or string of characters encrypted using a private key from a public key cryptography system. A digital signature may be a message, file, or string of characters configured via any method so as to allow reliable verification of the signer that cannot be easily falsified. Method 210 includes an act of verifying the authenticity of the digital certificate 171 by verifying the authenticity of the digital signature of the certificate authority 140 (act 213). The digital signature may be a message encrypted using the private key of the certificate authority 140. The authenticity of the digital signature may then be verified by decrypting the digital signature using the public key of the certificate authority 140. Method 210 includes an act of sending a request to the web server 153 requesting that the web server 153 send an acknowledgement with a digital signature of the specified domain (act 214). Method 210 includes an act of receiving an acknowledgement 172 from the web server 153 containing a digital signature of the specified domain (act 215). Method 210 includes an act of verifying the authenticity of the acknowledgement 172 by verifying the authenticity of the digital signature of the specified domain by using the public key for the specified domain (act 216). The digital signature of the specified domain may be a message encrypted using the private key of the specified domain. The authenticity of the digital signature of the specified domain may then be verified by decrypting the digital signature of the specified domain using the public key of the specified domain. The computer system may store an indication that the web server has access rights to store a database portion in the controlled access local store Method 210 includes an act of sending a Web based request to a Web server in a specified domain, the Web based request requesting access to a Web page that includes a portion of database data, the database portion stored in a database accessible to the Web server (e.g., through script code execution) (act 217). For example, script code of application 191C (running within browser 104) can send request 181 to Web server 153 in domain 151. Request 181 can be a request for access to a Web page that includes a portion of database 154.

Method 210 includes an act of receiving the database portion from the Web server (act 218). For example, Web browser 104 can receive database portion 154P included in Web page 183. Alternately, Web browser 104 can receive database portion 154P that was sent separately to Web browser 104 in response to request 181.

Method 210 includes an act of locally storing the received database portion at the computer system, the locally stored database portion being locally accessible to the Web browser such that data from the locally stored database portion can be locally provided to the Web browser without the data being included in network based communication (act 219). For example, Web browser 104 can store database portion 154P in local store 108. Accordingly, database portion 154P is locally accessible to Web browser 104 such that the locally stored database portion 154P can be provided to Web browser 104 without transferring database portion 154P via network 131.

Method 210 includes an act of retaining an indication that the database portion was received from the specified domain to prevent Web servers in other domains from accessing (e.g., through script code execution) the database portion (act 220). For example, domain name 152 can be stored along with database portion 154P in local store 108 to indicate that database portion 154P was received from domain 151. Local store access module 107 can compare the domain name associated with subsequent requests for database portion 154P to domain name 152 to determine if requests to access database portion 154P are granted.

Figure 1B:
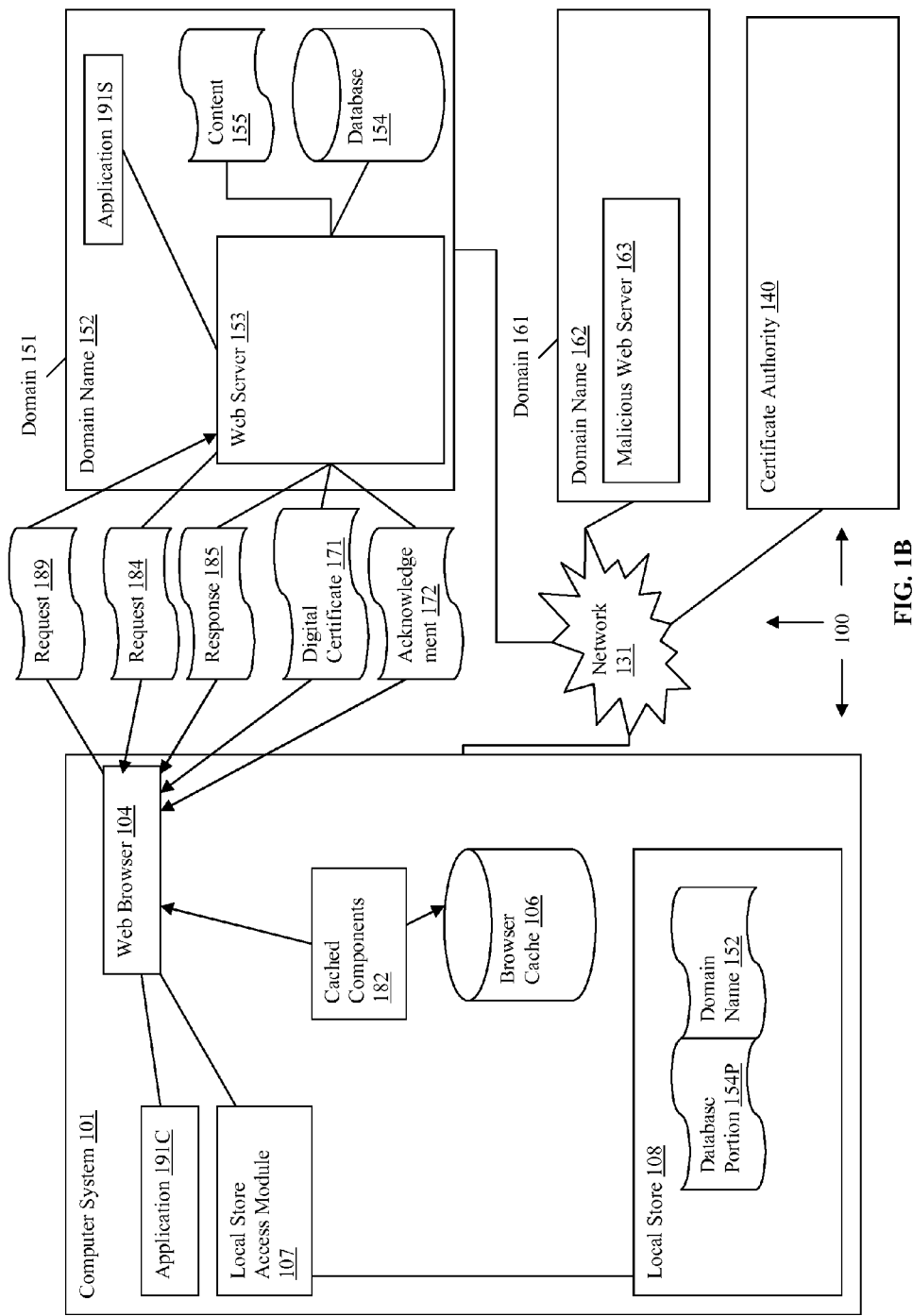

FIG. 1B illustrates example computer architecture 100 and further depicts domain 161. Domain 161 includes malicious Web server 163. Malicious Web server 163 can be configured to attempt to access cached components of other Web servers cached in browser cache 106 and to attempt to access database data from other domains stored in local store 108.

FIG. 3A illustrates a flow chart of an example method 300 for rendering tabular database data within the Web browser. The method 300 will be described with respect to the components of computer architecture 100 depicted in FIG. 1B.

Method 300 includes an act of sending a Web based request to a Web server in a specified domain indicated by a specified domain name, the Web based request for accessing a Web page that includes a portion of a database, the database portion stored in a database accessible to the Web server (act 301). For example, Web browser 104 can send request 189 to Web server 153 in domain 151. Request 189 can be associated with a URL that includes domain name 152. Request 189 can be a request to access a Web page that includes database portion 154P from database 154.

In response to request 189, Web server 153 can send request 184 back to Web browser 104. Request 184 can be a request to access a copy database portion 154P stored in local store 108.

Method 300 includes an act of receiving a request from the Web server for access to a locally stored database portion that is stored locally at the computer system (act 302). For example, Web browser 104 can receive request 184 (e.g., included script code) requesting access to database portion 154P stored in local store 108.

Method 300 includes an act of accessing a stored domain name indicative of a domain that previously sent the locally stored database portion to the computer system (act 303). For example, local store access module 107 can access domain name 152 indicative of a Web server in domain 151 having previously sent database portion 154P to Web browser 104.

Method 300 includes an act of comparing the specified domain name to the stored domain name (act 304). For example, local store access module can compare domain name 152 (stored in local store 108) to domain name 152 (associated with request 184). Method 300 includes an act determining that the specified domain name and the stored domain name are sufficiently similar to allow responses from the Web server to include the locally stored database portion (act 305). For example, local store access module 107 can determine that domain 152 (stored in local store 108) is identical to domain name 152 (associated with request 184). However, specified rules indicating lesser degrees of similarity can be used to determine if a specified domain name and a stored domain name are sufficiently similar.

Method 300 includes an act of including data from the locally stored database portion in a Web based response to the Web based request based on the determination (act 306). For example, database portion 154P can be included in response 185 (i.e., a response to request 189) based on the results of the comparison. Method 300 includes an act of presenting the Web based response including the locally stored database portion at the Web browser (act 307). For example, database portion 154P (as well as any other Web page components included in response 185) can be presented at Web browser 104.

Figure 3B:
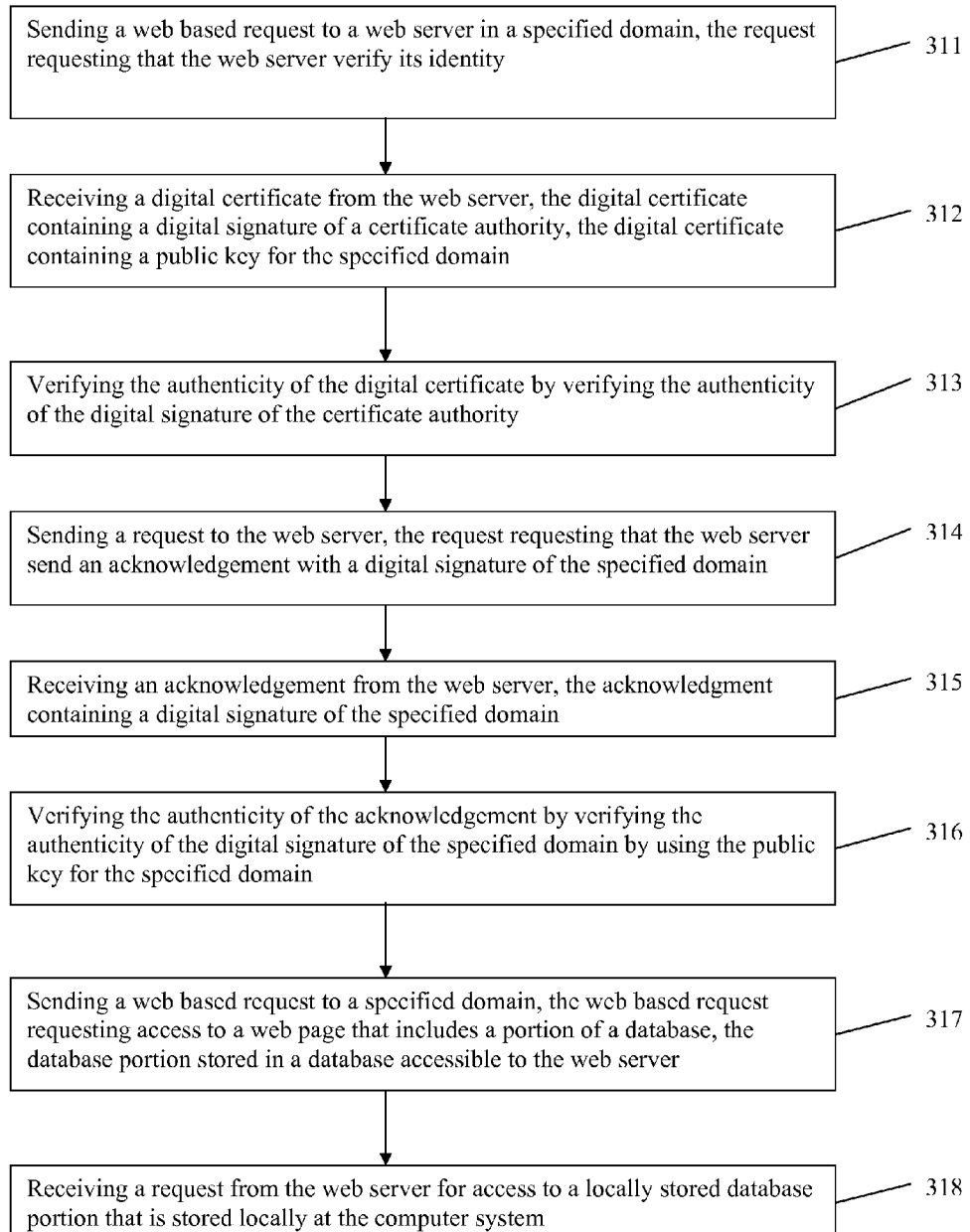

FIGS. 3B and 3C illustrate a flow chart of an example method 310 for rendering tabular database data within the Web browser in a secure manner. The method 310 will be described with respect to the components of computer architecture 100 depicted in FIG. 1B.

Method 310 includes an act of sending a web based request to the web server in the specified domain requesting that the web server verify its identity (act 311). Method 310 includes an act of receiving a digital certificate 171 from the web server 153, the digital certificate 171 containing a digital signature of the certificate authority 140, and the digital certificate 171 containing a public key for the specified domain (act 312). A public key may be a public key in a public key cryptography system. RSA is one example of a public key cryptography system. The present invention may be used with any public key cryptography system. A digital signature may be a message, file, or string of characters encrypted using a private key from a public key cryptography system. A digital signature may be a message, file, or string of characters configured via any method so as to allow reliable verification of the signer that cannot be easily falsified. Method 310 includes an act of verifying the authenticity of the digital certificate 171 by verifying the authenticity of the digital signature of the certificate authority 140 (act 313). The digital signature may be a message encrypted using the private key of the certificate authority 140. The authenticity of the digital signature may then be verified by decrypting the digital signature using the public key of the certificate authority 140. Method 310 includes an act of sending a request to the web server 153 requesting that the web server 153 send an acknowledgement with a digital signature of the specified domain (act 314). Method 310 includes an act of receiving an acknowledgement 172 from the web server 153 containing a digital signature of the specified domain (act 315). Method 310 includes an act of verifying the authenticity of the acknowledgement 172 by verifying the authenticity of the digital signature of the specified domain by using the public key for the specified domain (act 316). The digital signature of the specified domain may be a message encrypted using the private key of the specified domain. The authenticity of the digital signature of the specified domain may then be verified by decrypting the digital signature of the specified domain using the public key of the specified domain.

Method 310 includes an act of sending a Web based request to a Web server in a specified domain indicated by a specified domain name, the Web based request for accessing a Web page that includes a portion of a database, the database portion stored in a database accessible to the Web server (act 317). For example, Web browser 104 can send request 189 to Web server 153 in domain 151. Request 189 can be associated with a URL that includes domain name 152. Request 189 can be a request to access a Web page that includes database portion 154P from database 154.

In response to request 189, Web server 153 can send request 184 back to Web browser 104. Request 184 can be a request to access a copy database portion 154P stored in local store 108.

Method 310 includes an act of receiving a request from the Web server for access to a locally stored database portion that is stored locally at the computer system (act 318). For example, Web browser 104 can receive request 184 (e.g., included script code) requesting access to database portion 154P stored in local store 108.

Method 310 includes an act of accessing a stored domain name indicative of a domain that previously sent the locally stored database portion to the computer system (act 319). For example, local store access module 107 can access domain name 152 indicative of a Web server in domain 151 having previously sent database portion 154P to Web browser 104.

Method 310 includes an act of comparing the specified domain name to the stored domain name (act 320). For example, local store access module can compare domain name 152 (stored in local store 108) to domain name 152 (associated with request 184). Method 310 includes an act determining that the specified domain name and the stored domain name are sufficiently similar to allow responses from the Web server to include the locally stored database portion (act 321). For example, local store access module 107 can determine that domain 152 (stored in local store 108) is identical to domain name 152 (associated with request 184). However, specified rules indicating lesser degrees of similarity can be used to determine if a specified domain name and a stored domain name are sufficiently similar.

Method 310 includes an act of including data from the locally stored database portion in a Web based response to the Web based request based on the determination (act 322). For example, database portion 154P can be included in response 185 (i.e., a response to request 189) based on the results of the comparison. Method 310 includes an act of presenting the Web based response including the locally stored database portion at the Web browser (act 323). For example, database portion 154P (as well as any other Web page components included in response 185) can be presented at Web browser 104.

In some embodiments, the web server 153 may send a request to the computer system 101 indicating that the database portion 154P be stored in a secure or non-secure manner. If the request indicates that the database portion 154P be stored in a secure manner, then the computer system 101 allows access to the database portion 154P according to method 310. Otherwise, if the request indicates that the database portion 154P be stored in a non-secure manner or if no request is received, the computer system 101 allows access to the database portion according to method 300.

Embodiments of the invention can prevent a malicious server from accessing another server's locally stored database data. For example, it may be that malicious server 163 in domain 161 sends response that includes code (scripts) that request access to database data stored in local store 108 (e.g., through execution of a script). As such, local store access module 107 can compare domain name 162 (the domain name for domain 161) to stored domain names in local store 108 (e.g., domain name 152). If domain name 162 lacks sufficient similarity to any stored domain name, no access to stored database data is given. Thus, database data from other domains, such as, for example, database portion 154P, is protected from unauthorized access. That is, when domain name 152 and domain name 162 lack sufficiently similarity, local store access module 107 does not permit requests from domain 161 to access database portion 154P sent from domain 151 and stored in local store 108.

Malicious web server 163 in domain 161 may masquerade by presenting data falsely indicating that the web server 163 is in domain 151. However, the malicious web server 163 will fail to verify that it is in domain 151 under method 310. The malicious web server 163 will not be able to access database portion 154P sent from domain 151 and stored in local store 108.

A response from a Web server can include code (scripts) from the server, such as, for example, when a user specifically communicates with a Web site. A response can also include code (scripts) from 3rd party servers, such as, for example, when one Web site includes advertisements for another Web site.

A "malicious" Web server can be viewed as malicious from the perspective of data stored in local store 108, even when a user has legitimate reason to access a Web server. For example, a user may have bank accounts at both a first bank and a second bank. Thus, a user of computer system 101 has a legitimate (and in fact beneficial) reason to access Web sites for both the first and second banks. Further, through prior communication with the first bank's Web site, the first bank may have database data (e.g., a users account information) stored in local store 108. However, the user does not necessarily desire to give the second bank access to the first bank's locally stored database data. The domain name check can prevent scripts from the second bank from accessing the first bank's locally stored database data.

Accordingly, embodiments of the present invention can be used to "sandbox" locally stored Web-based database data per domain.

Accordingly, embodiments of the present invention permit Web-based database data to be locally stored at a computer system to increase the efficiency of rendering the Web-based database data within a Web browser at the computer system. Web-based database data can be sandboxed per domain to mitigate (and possibly eliminate) the exposure of the Web-based database data to malicious computer systems. Space allocated to each domain can be initially set and then subsequently altered by a user.

The present invention may be embodied in other specific forms without departing from its spirit or essential characteristics. The steps of the method of the invention may be performed in different orders without changing the invention. The characteristics, purposes, and principles of the invention can be preserved despite changing the order of steps of the invention. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including a Web browser, a browser cache, a local store access module, and a controlled access local store, the Web browser for browsing Web-based content, the local store access module controlling access to contents of the controlled access local store based on domains associated with Web server requests to access the contents of the controlled access local store, a method for caching database data at the computer system for subsequent Web browser access in a secure manner, the method comprising:

verifying the identity of a first Web server in a specified domain that is seeking to store a database portion in the controlled access local store at the computer system, by a method of digital certification comprising:

receiving a digital certificate from the first Web server in the specified domain, the digital certificate containing a digital signature of a certificate authority, the digital certificate containing a public key for the specified domain;

verifying the authenticity of the digital certificate by verifying the authenticity of the digital signature of the certificate authority;

receiving a digital signature of the specified domain from the first Web server;
verifying the authenticity of the digital signature of the specified domain by using the public key for the specified domain;
sending a Web based request from the computer system to the first Web server in the specified domain, the Web based request requesting access to a Web page that includes the database portion and other content;
receiving the requested Web page from the first Web server, the Web page including the database portion and the other content;
the Web browser in the computer system caching the other content in the browser cache;
storing the database portion in the controlled access local store such that data contained in the stored database portion can be locally provided to the Web browser without the data being included in network based communication;
retaining an indication that the database portion was received from the specified domain so that the local store access module can limit access to the database portion stored in the controlled access local store, the limited access including:
permitting requests from Web servers in the specified domain to access the database portion for use in Web pages presented at the Web browser, wherein the computer system authenticates that the Web servers are in the specified domain by a method of digital certification comprising:
receiving a digital certificate from a second Web server in the specified domain, where the second Web server is the first Web server or is a different server than the first Web server, the digital certificate containing a digital signature of a certificate authority, the digital certificate containing a public key for the specified domain;
verifying the authenticity of the digital certificate by verifying the authenticity of the digital signature of the certificate authority;
receiving a digital signature of the specified domain from the second Web server;
verifying the authenticity of the digital signature of the specified domain by using the public key for the specified domain;
and preventing requests from Web servers in other domains from accessing the database portion.

2. The method of claim 1, wherein the database portion from the first Web server stored in the controlled access local store comprises tabular data.

3. The method of claim 1, wherein the Web page includes script code.

4. The method of claim 1, further comprising storing an indication that the first Web server has access rights to store the database portion in the controlled access local store.

5. The method of claim 1, wherein the step of verifying the identity of the first Web server is performed after the step of sending the Web based request from the computer system to the first Web server to request access to the Web page.

6. The method of claim 1, further comprising:
receiving a request from the first Web server indicating that the database portion either be stored in a secure or non-secure manner;
wherein if the request indicates the database portion be stored in a secure manner, then the computer system retains an indication that the database portion was received from the specified domain so that the local store access module can limit access to the database portion stored in the controlled access local store, the limited access including:
permitting requests from Web servers in the specified domain to access the database portion for use in Web pages presented at the Web browser, wherein the computer system authenticates that the Web servers are in the specified domain by a method of digital certification comprising:
receiving a digital certificate from the second Web server in the specified domain, the digital certificate containing a digital signature of a certificate authority, the digital certificate containing a public key for the specified domain;
verifying the authenticity of the digital certificate by verifying the authenticity of the digital signature of the certificate authority;
receiving a digital signature of the specified domain from the second Web server;
verifying the authenticity of the digital signature of the specified domain by using the public key for the specified domain;
and preventing requests from Web servers in other domains from accessing the database portion;
wherein otherwise, then the computer system retains an indication that the database portion was received from the specified domain so that the local store access module can limit access to the database portion stored in the controlled access local store, the limited access including:
permitting requests from Web servers in the specified domain to access the database portion for use in Web pages presented at the Web browser;
and preventing requests from Web servers in other domains from accessing the database portion.

7. A computer system including a Web browser, a browser cache, a local store access module, and a controlled access local store, the Web browser for browsing Web-based content, the local store access module for controlling access to contents of the controlled access local store based on domains associated with Web server requests to access the contents of the controlled access local store, the computer system configured to:
verify the identity of a first Web server in a specified domain that seeks to store a database portion in the controlled access local store at the computer system, the verification using digital certification, including configuration of the computer system to:
receive a digital certificate from the first Web server in the specified domain, the digital certificate containing a digital signature of a certificate authority, the digital certificate containing a public key for the specified domain;
verify the authenticity of the digital certificate by verifying the authenticity of the digital signature of the certificate authority;
receive a digital signature of the specified domain from the first Web server;
verify the authenticity of the digital signature of the specified domain by using the public key for the specified domain;
send a Web based request from the computer system to the first Web server in the specified domain, the Web based request requesting access to a Web page that includes the database portion and other content;

receive the requested Web page from the first Web server, the Web page including the database portion and the other content;

cache the other content in the browser cache;

store the database portion in the controlled access local store such that data contained in the stored database portion can be locally provided to the Web browser without the data being included in network based communication;

retain an indication that the database portion was received from the specified domain so that the local store access module can limit access to the database portion stored in the controlled access local store, the limited access including configuration of the computer system to:

permit requests from Web servers in the specified domain to access the database portion for use in Web pages presented at the Web browser, wherein the computer system is configured to authenticate that the Web servers are in the specified domain by using digital certification, including configuration of the computer system to:

receive a digital certificate from a second Web server in the specified domain, where the second Web server is the first Web server or is a different server than the first Web server, the digital certificate containing a digital signature of a certificate authority, the digital certificate containing a public key for the specified domain;

verify the authenticity of the digital certificate by verifying the authenticity of the digital signature of the certificate authority;

receive a digital signature of the specified domain from the second Web server;

verify the authenticity of the digital signature of the specified domain by using the public key for the specified domain;

and prevent requests from Web servers in other domains from accessing the database portion.

8. The computer system of claim 7, wherein the database portion from the first Web server stored in the controlled access local store comprises tabular data.

9. The computer system of claim 7, wherein the Web page includes script code.

10. The computer system of claim 7, further configured to store an indication that the first Web server has access rights to store the database portion in the controlled access local store.

11. The computer system of claim 7, further configured to verify the identity of the first Web server at a time after the computer system sends the Web based request to the first Web server to request access to the Web page.

12. The computer system of claim 7, further configured to:

receive a request from the first Web server indicating that the database portion either be stored in a secure or non-secure manner;

wherein if the request indicates the database portion be stored in a secure manner, then the computer system is configured to retain an indication that the database portion was received from the specified domain so that the local store access module can limit access to the database portion stored in the controlled access local store, the limited access including configuration of the computer system to:

permit requests from Web servers in the specified domain to access the database portion for use in Web pages presented at the Web browser, wherein the computer system is configured to authenticate that the Web servers are in the specified domain by using digital certification, including configuration of the computer system to:

receive a digital certificate from the second Web server in the specified domain, the digital certificate containing a digital signature of a certificate authority, the digital certificate containing a public key for the specified domain;

verify the authenticity of the digital certificate by verifying the authenticity of the digital signature of the certificate authority;

receive a digital signature of the specified domain from the second Web server;

verify the authenticity of the digital signature of the specified domain by using the public key for the specified domain;

and prevent requests from Web servers in other domains from accessing the database portion;

wherein otherwise, then the computer system is configured to retain an indication that the database portion was received from the specified domain so that the local store access module can limit access to the database portion stored in the controlled access local store, the limited access including configuration of the computer system to:

permit requests from Web servers in the specified domain to access the database portion for use in Web pages presented at the Web browser;

and prevent requests from Web servers in other domains from accessing the database portion.

13. A computer system including a Web browser, a browser cache, a local store access module, and a controlled access local store, the Web browser for browsing Web-based content, the local store access module for controlling access to contents of the controlled access local store based on domains associated with Web server requests to access the contents of the controlled access local store, the computer system configured to:

verify the identity of a first Web server in a specified domain that seeks to store a database portion in the controlled access local store at the computer system, the verification using digital certification, including configuration of the computer system to:

receive a digital certificate from the first Web server in the specified domain, the digital certificate containing a digital signature of a certificate authority, the digital certificate containing a public key for the specified domain;

verify the authenticity of the digital certificate by verifying the authenticity of the digital signature of the certificate authority;

send a request from the computer system to the first Web server, the request requesting that the first Web server send an acknowledgement with a digital signature of the specified domain;

receive an acknowledgement from the first Web server, the acknowledgement containing the digital signature of the specified domain;

verify the authenticity of the digital signature of the specified domain by using the public key for the specified domain;

send a Web based request from the computer system to the first Web server in the specified domain, the Web based request requesting access to a Web page that includes the database portion and other content;

receive the requested Web page from the first Web server, the Web page including the database portion and the other content;

cache the other content in the browser cache;

store the database portion in the controlled access local store such that data contained in the stored database portion can be locally provided to the Web browser without the data being included in network based communication;

retain an indication that the database portion was received from the specified domain so that the local store access module can limit access to the database portion stored in the controlled access local store, the limited access including configuration of the computer system to:

permit requests from Web servers in the specified domain to access the database portion for use in Web pages presented at the Web browser, wherein the computer system is configured to authenticate that the Web servers are in the specified domain by using digital certification, including configuration of the computer system to:

receive a digital certificate from a second Web server in the specified domain, where the second Web server is the first Web server or is a different server than the first Web server, the digital certificate containing a digital signature of a certificate authority, the digital certificate containing a public key for the specified domain;

verify the authenticity of the digital certificate by verifying the authenticity of the digital signature of the certificate authority;

send a request from the computer system to the second Web server, the request requesting that the second Web server send an acknowledgement with a digital signature of the specified domain;

receive an acknowledgement from the second Web server, the acknowledgement containing the digital signature of the specified domain;

verify the authenticity of the digital signature of the specified domain by using the public key for the specified domain;

and prevent requests from Web servers in other domains from accessing the database portion.

14. The computer system of claim 13, wherein the database portion from the first Web server stored in the controlled access local store comprises tabular data.

15. The computer system of claim 13, wherein the Web page includes script code.

16. The computer system of claim 13, further configured to store an indication that the first Web server has access rights to store the database portion in the controlled access local store.

17. The computer system of claim 13, further configured to verify the identity of the first Web server at a time after the computer system sends the Web based request to the first Web server to request access to the Web page.

18. The computer system of claim 13, further configured to:

receive a request from the first Web server indicating that the database portion either be stored in a secure or non-secure manner;

wherein if the request indicates the database portion be stored in a secure manner, then the computer system is configured to retain an indication that the database portion was received from the specified domain so that the local store access module can limit access to the database portion stored in the controlled access local store, the limited access including configuration of the computer system to:

permit requests from Web servers in the specified domain to access the database portion for use in Web pages presented at the Web browser, wherein the computer system is configured to authenticate that the Web servers are in the specified domain by using digital certification, including configuration of the computer system to:

receive a digital certificate from the second Web server in the specified domain, the digital certificate containing a digital signature of a certificate authority, the digital certificate containing a public key for the specified domain;

verify the authenticity of the digital certificate by verifying the authenticity of the digital signature of the certificate authority;

send a request from the computer system to the second Web server, the request requesting that the second Web server send an acknowledgement with a digital signature of the specified domain;

receive an acknowledgement from the second Web server, the acknowledgement containing the digital signature of the specified domain;

verify the authenticity of the digital signature of the specified domain by using the public key for the specified domain;

and prevent requests from Web servers in other domains from accessing the database portion;

wherein otherwise, then the computer system is configured to retain an indication that the database portion was received from the specified domain so that the local store access module can limit access to the database portion stored in the controlled access local store, the limited access including configuration of the computer system to:

permit requests from Web servers in the specified domain to access the database portion for use in Web pages presented at the Web browser;

and prevent requests from Web servers in other domains from accessing the database portion.

* * * * *